United States Patent
Tariq et al.

(10) Patent No.: US 9,607,245 B2
(45) Date of Patent: Mar. 28, 2017

(54) ADAPTED VOCABULARIES FOR MATCHING IMAGE SIGNATURES WITH FISHER VECTORS

(71) Applicant: Xerox Corporation, Norwalk, CT (US)

(72) Inventors: Usman Tariq, Sharjah (AE); José Antonio Rodriguez Serrano, Grenoble (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 106 days.

(21) Appl. No.: 14/557,891

(22) Filed: Dec. 2, 2014

(65) Prior Publication Data

US 2016/0155020 A1    Jun. 2, 2016

(51) Int. Cl.
  *G06K 9/00*  (2006.01)
  *G06K 9/62*  (2006.01)
  *G06K 9/46*  (2006.01)
  *G06K 9/32*  (2006.01)
  *G06T 7/00*  (2017.01)

(52) U.S. Cl.
  CPC ....... *G06K 9/6215* (2013.01); *G06K 9/00771* (2013.01); *G06K 9/3258* (2013.01); *G06K 9/4609* (2013.01); *G06K 9/6202* (2013.01); *G06T 7/0032* (2013.01)

(58) Field of Classification Search
  None
  See application file for complete search history.

(56) References Cited

U.S. PATENT DOCUMENTS

| 4,433,325 | A | 2/1984 | Tanaka et al. |
| 5,083,200 | A | 1/1992 | Deffontaines |
| 5,592,567 | A | 1/1997 | Kilger |
| 5,809,161 | A | 9/1998 | Auty et al. |
| 5,995,900 | A | 11/1999 | Hsiao et al. |
| 6,914,599 | B1 * | 7/2005 | Rowe .............. G06T 7/0022 345/420 |

(Continued)

OTHER PUBLICATIONS

Rodríguez Serrano, et al., "Unsupervised writer adaptation of whole-word HMMs with application to word-spotting," Pattern Recognition Letters, vol. 31, pp. 742-749 (2010).

(Continued)

*Primary Examiner* — Randolph I Chu
(74) *Attorney, Agent, or Firm* — Fay Sharpe LLP (57) ABSTRACT

A method includes adapting the universal generative model of local descriptors to a first camera to obtain a first camera-dependent generative model. The same universal generative model is also adapted to a second camera to obtain a second camera-dependent generative model. From a first image captured by the first camera, a first image-level descriptor is extracted, using the first camera-dependent generative model. From a second image captured by the second camera, a second image-level descriptor is extracted using the second camera-dependent generative model. A similarity is computed between the first image-level descriptor and the second image-level descriptor. Information is output, based on the computed similarity. The adaptation allows differences between the image-level descriptors to be shifted towards deviations in image content, rather than the imaging conditions.

20 Claims, 6 Drawing Sheets

(56) References Cited

U.S. PATENT DOCUMENTS

| | | |
|---|---|---|
| 6,996,255 B2 | 2/2006 | Sakuma et al. |
| 2003/0147558 A1* | 8/2003 | Loui ................ G06K 9/00624 382/225 |
| 2008/0069456 A1 | 3/2008 | Perronnin |
| 2009/0144033 A1 | 6/2009 | Liu et al. |
| 2009/0208059 A1* | 8/2009 | Geva .................... G06K 9/3258 382/105 |
| 2011/0141288 A1* | 6/2011 | Huang ............... G06K 9/00771 348/169 |
| 2012/0045134 A1 | 2/2012 | Perronnin et al. |
| 2012/0076401 A1 | 3/2012 | Sánchez et al. |
| 2013/0129151 A1 | 5/2013 | Rodríguez Serrano et al. |
| 2013/0129152 A1 | 5/2013 | Rodríguez Serrano et al. |
| 2013/0163815 A1* | 6/2013 | Mai ......................... G06T 7/20 382/103 |
| 2013/0182909 A1 | 7/2013 | Rodríguez-Serrano |
| 2013/0208124 A1* | 8/2013 | Boghossian ........... H04N 7/181 348/159 |
| 2013/0259314 A1* | 10/2013 | Kozitsky .............. G06K 9/3258 382/105 |
| 2013/0336538 A1 | 12/2013 | Skaff et al. |
| 2014/0028842 A1* | 1/2014 | Abramson ............... H04N 7/18 348/143 |
| 2014/0029839 A1 | 1/2014 | Mensink et al. |
| 2014/0056520 A1 | 2/2014 | Rodríguez Serrano |
| 2014/0063263 A1 | 3/2014 | Bernal et al. |
| 2014/0219563 A1 | 8/2014 | Rodríguez-Serrano et al. |
| 2014/0270381 A1 | 9/2014 | Wu et al. |
| 2014/0294231 A1* | 10/2014 | Datta .................... G06T 7/2093 382/103 |
| 2015/0261845 A1* | 9/2015 | Chen .................. G06F 17/3028 707/609 |
| 2015/0262033 A1* | 9/2015 | Chen ...................... G06K 9/622 382/225 |
| 2015/0304634 A1* | 10/2015 | Karvounis .............. G06T 7/002 348/46 |
| 2015/0310172 A1* | 10/2015 | Takata .................. G06F 19/321 382/128 |
| 2016/0132750 A1* | 5/2016 | Yang ........................ G06K 9/52 382/197 |

OTHER PUBLICATIONS

U.S. Appl. No. 13/903,218, filed May 28, 2013, José Antonio Rodríguez Serrano, et al.

U.S. Appl. No. 14/054,998, filed Oct. 16, 2013, José Antonio Rodríguez Serrano, et al.

U.S. Appl. No. 14/477,215, filed Sep. 4, 2015, Boris Chidlovskii.

U.S. Appl. No. 14/497,417, filed Sep. 26, 2014, José Antonio Rodriguez-Serrano.

U.S. Appl. No. 14/504,837, filed Oct. 2, 2014, Gabriela Csurka, et al.

Arandjelovic, Relja, et al., "All about VLAD," Proc. 2013 IEEE Conf. on Computer Vision and Pattern Recognition (CVPR '13), pp. 1578-1585 (2013).

Beijbom, Oscar, "Domain adaptations for computer vision applications," CoRR, abs/1211.4860, pp. 1-9 (2012), available at http://arxiv.org/abs/1211.4860.

Bilmes, Jeff A., et al. "A gentle tutorial of the EM algorithm and its application to parameter estimation for Gaussian mixture and Hidden Markov models," Intern'l Computer Science Institute, 4(510), p. 126 (1998).

Chen, Qiang, et al., "Efficient maximum appearance search for large-scale object detection," 2013 IEEE Conference on Computer Vision and Pattern Recognition (CVPR), pp. 3190-3197 (Jun. 2013).

Csurka, Gabriela, et al., "Visual Categorization with Bags of Key-points," in ECCV Workshop on Statistical Learning for Computer Vision, pp. 536-545 (2004).

Fernando, Basura, et al., Unsupervised visual domain adaptation using subspace alignment, ICCV, pp. 2960-2967 (2013).

Gong, et al., "Geodesic flow kernel for unsupervised domain adaptation," CVPR, pp. 2066-2073 (2012).

Gopalan, et al., "Domain adaptation for object recognition: An unsupervised approach," ICCV, pp. 999-1006 (2011).

Hoffman, J., et al., "Discovering latent domains for multisource domain adaptation," ECCV, vol. Part II, pp. 702-715 (2012).

Jiang, et al., "A Literature Survey on Domain Adaptation of Statistical Classifiers," Technical report pp. 1-12 (2008).

Kulis, et al., "What you saw is not what you get: Domain adaptation using asymmetric kernel transforms," CVPR, pp. 1785-1792 (2011).

Lazebnik, et al., "Beyond bags of features: Spatial pyramid matching for recognizing natural scene categories," CVPR '06 Proc. 2006 IEEE Computer Society Conf. on Computer Vision and Pattern Recognition—vol. 2, pp. 2169-2178 (2006).

Lowe, et al., "Distinctive image features from scale-invariant keypoints," IJCV, pp. 91-110 (2004).

Ma, Bingpeng, et al., "Local descriptors encoded by Fisher vectors for person reidentification," Computer Vision Workshops and Demonstrations, ECCV 2012, Lecture Notes in Computer Science, vol. 7583, pp. 413-422 (2012).

Patel, Vishal M., et al., "Visual domain adaptation: An overview of recent advances," submitted Feb. 19, 2014, pp. 1-34, downloaded at http://www.umiacs.umd.edu/~pvishalm/Journal_pub/SPM_DA_v7_embeded.pdf on Sep. 23, 2014.

Perronnin, Florent, et al., "Improving the fisher kernel for large-scale image classification," Proc. $11^{th}$ European Conference on Computer Vision (ECCV): Part IV, pp. 143-156 (2010).

Perronnin, Florent, et al., "Fisher kernels on visual vocabularies for image categorization," IEEE Conference on Computer Vision and Pattern Recognition (CVPR '07), pp. 1-8 (2007).

Reynolds, Douglas A., et al., "Speaker verification using adapted Gaussian mixture models," Digital Signal Processing, 10(13):19-41 (2000).

Rodríguez Serrano, José A., et al., "Synthesizing queries for handwritten word image retrieval," Pattern Recognition, vol. 45, pp. 3270-3276 (2012).

Rodríguez Serrano, José A., et al., "Data-Driven Vehicle Identification by Image Matching". $12^{th}$ European Conf. on Computer Vision (ECCV) Workshops, Oct. 7-13, 2012, Lecture Notes in Computer Science, vol. 7584, pp. 536-545.

Saenko, K., et al., "Adapting visual category models to new domains," ECCV, vol. 6314 of Lecture Notes in Computer Science, pp. 213-226 (2010).

Sánchez, Jorge, et al., "Image classification with the Fisher Vector: Theory and practice," Intern'l J. Computer Vision (IJCV), 105(3):222-245 (2013).

Sánchez, Jorge, et al., "High-dimensional signature compression for large-scale image classification," CVPR, pp. 1665-1672 (2011).

Woodland, P. C., "Speaker adaptation: techniques and challenges," ASRU Workshop, pp. 85-90 (1999).

Zha, et al., "Robust distance metric learning with auxiliary knowledge," IJCAI, pp. 1327-1332 (2009).

Perronnin, et al., "Large-scale image retrieval with compressed Fisher vectors," In IEEE Conference on Computer Vision and Pattern Recogniion (CVPR), 2010, pp. 3384-3391 (2010).

\* cited by examiner

ADAPTED VOCABULARIES FOR MATCHING IMAGE SIGNATURES WITH FISHER VECTORS

BACKGROUND

The exemplary embodiment relates to image processing and finds particular application in connection with object detection in images.

There are many cases where it is desirable to match objects in images acquired by different cameras in different locations. For example, still cameras or video cameras may be positioned to acquire images for use in automated or semi-automated toll assessment for toll roads and bridges, automated monitoring of a parking facility, camera based enforcement of speed limits or other traffic regulations, monitoring of carpool lanes, roadway usage studies, and the like. Depending upon the application, the vehicle images that are acquired may be an image of the entire vehicle, or an image of a portion of the vehicle, such as the rear license plate.

One problem with matching an object in different images (referred to as re-identification) is that the imaging conditions may be different. The difference in imaging conditions may be due to various reasons, such as cameras placed at different angles, differences in backgrounds, lighting conditions, due for example, to the time of the day or different weather conditions, camera settings, camera resolution or other camera characteristics, amount of motion blur, and post-processing. In general, if the difference in imaging conditions is significant, then it may impact computer vision tasks, such as object recognition or image matching. One reason is that even when the same features are extracted in both instances, the imaging conditions can strongly affect the feature distribution. This means that the assumptions of the classifier trained for one set of conditions do not always hold for the other.

For image matching, a feature-based representation of a captured image is often generated. For example, one method of representing an image or a part of an image is with a Fisher Vector (FV). In this method, it is assumed that a generative model exists (such as a Gaussian Mixture Model (GMM)) from which descriptors of image patches are emitted, and the Fisher Vector components are the gradient of the log-likelihood of the descriptor with respect to one or more parameters of the model. Each patch used for training can thus be characterized by a vector of weights, one (or more) weight(s) for each of a set of Gaussian functions forming the mixture model. Given a new image, a representation can be generated (often called an image signature) based on the characterization of its patches with respect to the trained GMM.

In a typical transportation application, cameras are placed at various strategic locations: for example, at various toll booths, and each camera is independently trained and thereafter used to generate representations of vehicles at (or passing through) the location. If two representations match, it can be assumed that the vehicles are the same. However, even small variations between the images captured with different cameras can impact performance significantly.

Domain adaption techniques have been developed for adapting data from one domain to use in another. Jiang, J., "A literature survey on domain adaptation of statistical classifiers," Technical report pp. 1-12 (2008), and Beijbom, O. "Domain adaptations for computer vision applications," Technical report, arXiv:1211.4860v1 [cs.CV] 20 pp. 1-9 (November 2012) provide surveys focusing on learning theory and natural language processing applications and computer vision applications. Some approaches focus on transforming the feature space in order to bring the domains closer. In some cases, an unsupervised transformation, generally based on PCA projections, is used. See, Gopalan, R., et al., "Domain adaptation for object recognition: An unsupervised approach," ICCV, pp. 999-1006 (2011); Gong, B., et al., "Geodesic flow kernel for unsupervised domain adaptation," CVPR, pp. 2066-2073 (2012); and Fernando, B., et al., "Unsupervised visual domain adaptation using subspace alignment," ICCV, pp. 2960-2967 (2013). In others, metric learning that exploits class labels (in general both in the source and in the target domain) is used to learn a transformation of the feature space such that in this new space the instances of the same class become closer to each other than to instances from other classes, independently of the domain to which they belong. See, Zha, Z.-J., et al., "Robust distance metric learning with auxiliary knowledge," IJCAI, pp 1327-1332 (2009); Saenko, K., et al., "Adapting visual category models to new domains," ECCV, Vol. 6314 of Lecture Notes in Computer Science, pp. 213-226 (2010); Kulis, B., et al., "What you saw is not what you get: Domain adaptation using asymmetric kernel transforms," CVPR, pp. 1785-1792 (2011); and Hoffman, J., et al., "Discovering latent domains for multisource domain adaptation," ECCV, Vol. Part II, pp. 702-715 (2012).

Many of these techniques are geared toward classification problems and would therefore be difficult to apply to a matching problem, such as re-identification, where there is no notion of class. Others require significant amounts of training data, which is not practical for many applications.

The exemplary embodiment provides a system and method for generating image representations, such as Fisher Vectors, which reduces the effect of difference in imaging conditions on image matching.

INCORPORATION BY REFERENCE

The following references, the disclosures of which are incorporated herein by reference in their entireties, are mentioned:

Methods for computing Fisher Vectors are described, for example, in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., Jorge Sánchez, et al., "High-dimensional signature compression for large-scale image classification," in CVPR 2011, Jorge Sánchez and Thomas Mensink, "Improving the fisher kernel for large-scale image classification," Proc. 11$^{th}$ European Conference on Computer Vision (ECCV): Part IV, pp. 143-156 (2010), Jorge Sánchez, et al., "Image Classification with the Fisher Vector: Theory and Practice," International Journal of Computer Vision (IJCV) 105(3): 222-245 (2013), hereinafter, Sánchez 2013.

U.S. application Ser. No. 14/477,215, filed Sep. 4, 2014, entitled DOMAIN ADAPTATION FOR IMAGE CLASSIFICATION WITH CLASS PRIORS, by Boris Chidlovskii and Gabriela Csurka, discloses a labeling system with a boosting classifier trained to classify an image belonging to a target domain and represented by a feature vector. Labeled feature vectors representing training images for both the target domain and a set of source domains are provided for training. Training involves generating base classifiers and base classifier weights of the boost classifier in an iterative process. At one of the iterations, a set of sub-iterations is performed, in which a candidate base classifier is trained on a training set combining the target domain training set and the source domain training set and the candidate base classifier with lowest error for the target domain training set is selected. Given a feature vector representing the image to be labeled, a label is generated for the image using the learned weights and selected candidate base classifiers.

U.S. Pub. No. 20090144033, published Jun. 4, 2009, entitled OBJECT COMPARISON, RETRIEVAL, AND CATEGORIZATION METHODS AND APPARATUSES, by Yan Liu, et al., discloses adapting N universal mixture model components to a first object to generate N corresponding first object mixture model components, where N is an integer greater than or equal to two; and generating a similarity measure based on component-by-component comparison of the N first object mixture model components with corresponding N second object mixture model components obtained by adaptation of the N universal mixture model components to a second object.

U.S. application Ser. No. 14/504,837, filed Oct. 2, 2014, entitled SYSTEM FOR DOMAIN ADAPTATION WITH A DOMAIN-SPECIFIC CLASS MEANS CLASSIFIER, by Gabriela Csurka, et al., and U.S. Pub. No. 20140029839, published Jan. 30, 2014, entitled METRIC LEARNING FOR NEAREST CLASS MEAN CLASSIFIERS, by Thomas Mensink, et al. disclose methods for learning classifiers using out-of-domain labeled data.

The following relate generally to methods for vehicle and license plate recognition: U.S. patent application Ser. No. 14/054,998, filed Oct. 16, 2013, entitled "DELAYED VEHICLE IDENTIFICATION FOR PRIVACY ENFORCEMENT," by José Antonio Rodríguez Serrano, et al.; U.S. application Ser. No. 14/497,417, filed 26 Sep. 2014, entitled MULTI-QUERY PRIVACY-PRESERVING PARKING MANAGEMENT SYSTEM AND METHOD, by José Antonio Rodriguez-Serrano; U.S. Pub. No. 20130129151, published May 23, 2013, entitled METHODS AND SYSTEMS FOR IMPROVED LICENSE PLATE SIGNATURE MATCHING BY SIMILARITY LEARNING ON SYNTHETIC IMAGES, by José Antonio Rodríguez Serrano, et al.; U.S. Pub. No. 20130129152, published May 23, 2013, entitled METHODS AND SYSTEMS FOR IMPROVING YIELD IN WANTED VEHICLE SEARCHES, by José Antonio Rodríguez Serrano, et al.; U.S. Pub. No. 20130182909, published Jul. 18, 2013, entitled IMAGE SEGMENTATION BASED ON APPROXIMATION OF SEGMENTATION SIMILARITY, by José Antonio Rodríguez Serrano; U.S. Pub. No. 20130259314, published Oct. 3, 2013, entitled METHODS AND SYSTEMS FOR ENHANCING THE PERFORMANCE OF AUTOMATED LICENSE PLATE RECOGNITION APPLICATIONS UTILIZING MULTIPLE RESULTS, by Vladimir Kozitsky, et al.; U.S. Pub. No. 20130336538, published Dec. 19, 2013, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.; U.S. Pub. No. 20140056520, published Feb. 27, 2014, entitled REGION REFOCUSING FOR DATA-DRIVEN OBJECT LOCALIZATION, by José Antonio Rodríguez Serrano; U.S. Pub. No. 20140063263, published Mar. 6, 2014, entitled SYSTEM AND METHOD FOR OBJECT TRACKING AND TIMING ACROSS MULTIPLE CAMERA VIEWS, by Edgar A. Bernal, et al.; and U.S. Pub. No. 20140270381, published Sep. 18, 2014, entitled METHODS AND SYSTEM FOR AUTOMATED IN-FIELD HIERARCHICAL TRAINING OF A VEHICLE DETECTION SYSTEM, by Wencheng Wu, et al.

BRIEF DESCRIPTION

In accordance with one aspect of the exemplary embodiment, a method includes providing a universal generative model of local descriptors, adapting the universal generative model to a first camera to obtain a first camera-dependent generative model. The universal generative model is also adapted to a second camera to obtain a second camera-dependent generative model (or the universal generative model can be used as the second camera-dependent generative model). From a first image captured by the first camera, a first image-level descriptor is extracted, using the first camera-dependent generative model. From a second image captured by the second camera, a second image-level descriptor is extracted using the second camera-dependent generative model. A similarity is computed between the first image-level descriptor and the second image-level descriptor. Information is output, based on the computed similarity.

At least one of the adapting the universal generative model to the first and second cameras, extracting the first and second image-level descriptors and the computing of the similarity may be performed with a computer processor.

In accordance with another aspect of the exemplary embodiment, a system includes memory which stores a universal generative model of local descriptors. An adaptation component adapts the universal generative model to a first camera to obtain a first camera-dependent generative model and adapts the universal generative model to a second camera to obtain a second camera-dependent generative model. A processor implements the adaptation component.

In accordance with another aspect of the exemplary embodiment, a method for generating a system for object reidentification includes providing a universal generative model generated using local descriptors extracted from images in a training set. The universal generative model is adapted to a first camera to obtain a first camera-dependent generative model using local descriptors extracted from images captured by the first camera. The universal generative model is adapted to a second camera to obtain a second camera-dependent generative model using local descriptors extracted from images captured by the first camera. A component is provided for computing at least one of an image-level representation of a first image using the first camera-dependent generative model, and an image-level representation of a first image using the first camera-dependent generative model. A component is provided for computing a similarity between the first image-level descriptor and the second image-level descriptor.

The adaptation may be performed with a computer processor.

BRIEF DESCRIPTION OF THE DRAWINGS

FIG. 2, which for ease of illustration has been split into

DETAILED DESCRIPTION

The exemplary embodiment relates to object matching and will be described with particular reference to object re-identification. In aspects of the exemplary embodiment, a system and method for object reidentification are described. The system and method can be used to determine whether two images contain the same object instance, for example, whether two images are of the same car (e.g., whether the same vehicle is being observed at the entry and exit of a facility), the same bicycle, the same airplane, or the like. To match two images, a representation is extracted based on local descriptors that are representative of the pixels of the image. As an example, each representation may include one or more Fisher Vectors that are representative of the whole image or representative of a region of interest (ROI) in the image predicted to include the object (e.g., a license plate). A similarity metric between the two Fisher Vectors is then computed. The Fisher Vectors encode deviations with respect to a generative model. A threshold on the similarity metric may then be used to decide whether the two images are of the same object instance.

In other aspects of the exemplary embodiment, a system and method for generating the object reidentification system are described.

As noted above, where the imaging conditions are different for capture of two images of an object, then the extracted Fisher Vectors may not be similar, despite containing the same object instance. In the exemplary embodiment, a universal generative model is learned a priori. A shift in the imaging conditions is reflected in the form of a corresponding shift in the model. To counter this shift, the parameters of the generative model are adapted in an unsupervised manner using images captured under each of the two imaging conditions (e.g., from two cameras). The result is two camera-specific generative models, each with a respective "adapted visual vocabulary". The deviations from these models encoded in the form of Fisher Vectors, is then shifted towards deviations in image content, rather than the imaging condition.

Figure 1:
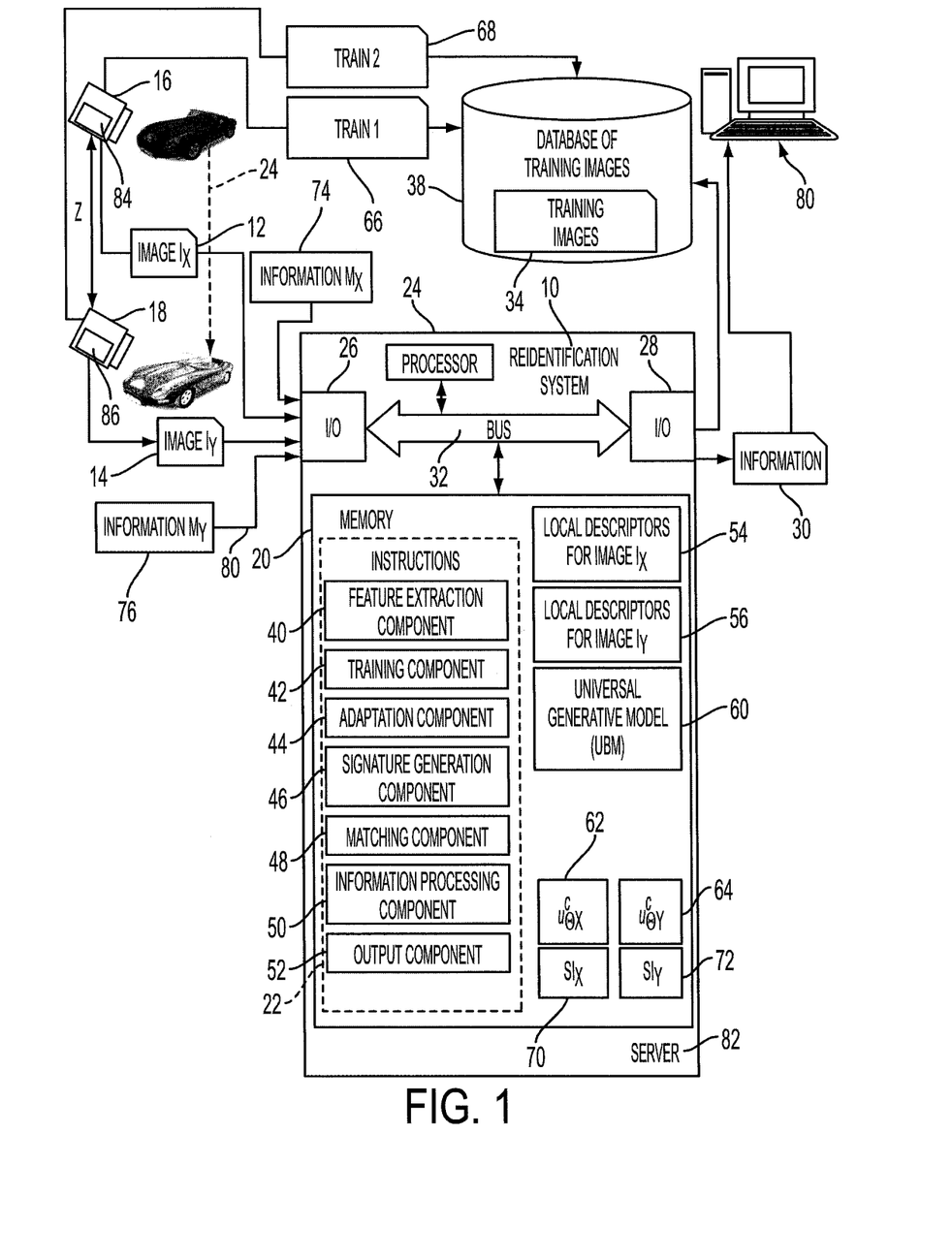
FIG. 1 is functional block diagram of a system for object re-identification in accordance with one aspect of the exemplary embodiment.

With reference to FIG. 1, a system 10 for object re-identification is shown. The system 10 receives test images 12, 14 from cameras 16, 18 and processes the images 12, 14 to determine whether they include the same object.

As used herein, the term "object" refers to an inanimate object (or group of inanimate objects), such as a vehicle, license plate, other article of manufacture, building, or the like, or to an animate object (or group of inanimate objects), such as a person or group of people, or an animal or group of animals. In particular, the term "object" refers to a physical object that can be imaged by cameras 16, 18 used by the system.

In the exemplary embodiment, the object is a vehicle such as a motorized vehicle, or its license plate which includes an identifier for the vehicle, including the license number of the vehicle. However, it is to be appreciated that other moving objects and their identifiers are also contemplated, such as people and their respective fingerprints and/or eye scans, shipping parcels and their tracking or address information, and the like. Vehicle identification may be desired at multiple locations and/or at different times, for example at the entry and exit of a car park or at different points on a road. For the sake of simplification, two locations X and Y which are spaced from each other by a distance Z are considered, although it is to be appreciated that X and Y may be at or close to the same location.

In one example embodiment, the aim is to find correspondences between the vehicle identities at X and Y, and when a correspondence between two identities has been established, to determine whether a certain condition is met that depends on information captured at X and Y. If the condition is met, a specified action is triggered, such as license plate recognition.

As used herein, the term "camera" refers to an imaging device that is capable of acquiring an image of an object of interest. By way of some non-limiting examples, the camera may be: a conventional camera including photographic film or a digital imaging array (e.g., CCD array optionally with color filters) that is capable of acquiring color or monochrome images similar to those that would be observed by human vision; or an x-ray scanner including an x-ray sensitive imaging array operating in conjunction with an x-ray source to generate an x-ray projection image; or a computed tomography scanner; or an infrared camera of the type used to acquire night or low-light images; or a document scanner operating to generate document page images; or the like. It is contemplated for the camera to be specialized for the specific object labeling task, for example including wavelength selective filters so as to be sensitive to wavelength(s) emitted by a fluorescent dye that is expected to be present on or in the object. In general the camera may be a still camera (that is, acquires a single static image) or a video camera (that is, acquires a time sequence of images commonly called "frames"—here the image pre-processing may entail selecting a frame of a video burst that optimally captures the object of interest). In some types of cameras, such as a computed tomography scanner, data acquired from the object by the camera may undergo image reconstruction processing in order to generate the image.

The system 10 illustrated in FIG. 1 includes memory 20 which stores instructions 22 for performing the method described with reference to FIG. 2 and a processor device 24 in communication with the memory for executing the instructions. One or more network interfaces 26, 28 are provided for receiving the images 12, 14 (or features extracted therefrom) from the cameras 16, 18 and outputting information 30 based thereon. Hardware components 20, 24, 26, 28 of the system communicate via a data/control bus 32. A set 34 of general training images, may be stored in a database 38, e.g., in system memory 20 or in associated memory communicatively connected with the system. The training images 34 are not specific to either one of the cameras 16, 18, but may be representative of the type of image to be captured by the cameras.

Briefly, the instructions 22 include a feature extraction component 40, a training component 42, an adaptation component 44, a signature generation component 46, a matching component 48, optionally, a process implementation component 50, and an information output component 52.

The feature extraction component 40 extracts local features and generates local descriptors 54, 56 from images, such as images 12, 14 and training images 34, etc. As will be appreciated, the training images 34 and images 12, 14 acquired by the cameras may be cropped or otherwise preprocessed prior to extraction of the local descriptors.

The training component 42 trains a universal generative model 60 of local descriptors using the local descriptors generated from the set 34 of general training images as training data. The training images 34 may have been acquired from a set of cameras which, in one embodiment, may include the cameras 16, 18. The training images 34 may thus be similar, in visual content, to the images acquired by cameras 16, 18. The generative model 60 is referred to as a Universal Background Model (UBM). The UBM 60 may be a Gaussian mixture model (GMM) which includes parameters for a set of Gaussian functions.

The adaptation component 44 adapts the generative model 60 to each camera 16, 18 to obtain a respective camera-specific model 62, 64, which in the exemplary embodiment are GMMs. To adapt the UBM 60, local descriptors extracted from a respective set of unlabeled training samples 66, 68 captured by each of the cameras 16, 18 (or specific to the capture locations) are used to adapt the generative model 60 to suit the different imaging conditions at the respective locations. As will be appreciated, while two cameras 16, 18 are illustrated, any number of cameras may be provided with a respective camera-dependent model 62, 64.

Given the local descriptors 54 extracted from a first test image 12 and the generative model 62 of the first camera 16, the signature generation component 46, extracts a first image-level descriptor (image signature) 70, denoted $SI_X$. Given the local descriptors 56 extracted from a second test image 14 and the generative model 64 of the second camera 18, the signature generation component 46 (which could be a separate signature generation component) extracts a second image-level descriptor 72, denoted $SI_Y$. The image-level descriptors 70, 72 may each be a soft bag-of-visual words or a Fisher Vector.

The matching component 48 computes a matching between the image signatures 70, 72, computed from the different images, by computing a similarity, e.g., a cosine distance between $SI_X$ and $SI_Y$. If the similarity at least meets a threshold, the two images (or the objects captured within them), may be inferred to be a match, i.e., the same object.

The process implementation component 50 may implement a process based on the output of the matching component. For example, in the case of images of vehicles, if the vehicles are a match, then license plate information may be extracted from one or both of the images. This may be conditional on a further condition being met, such as a computed speed of the vehicle exceeding a threshold, or the like. This may be computed based on information such as timestamps $M_X$, $M_Y$ 74, 76, associated with the capture of the respective images 12, 14.

The information output component 52 outputs information 30, e.g., to an output device 80, such as a remote computer, printer, display device (e.g., computer screen), or remote memory storage device, or combination thereof, based on the inference made by the matching component or other information, based on the information computed by the process implementation component 50.

The system 10 may communicate, via input/output interface 28, with one or more of a display device, such as an LCD screen or computer monitor, for displaying information to users, and a user input device, such as a keyboard or touch or writable screen, and/or a cursor control device, such as mouse, trackball, or the like, for inputting text and for communicating user input information and command selections to the processor 24. The display device and user input device are illustrated as being part of a client computing device 80, although in other embodiments, they may be directly linked to the computer 82 hosting the system.

The system 10 may be resident on one or more computing devices 82, such as a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated parts of the system 10 may be distributed over two or more computing devices. For example, local descriptors for images 12, 14 may be computed by processing components 84, 86 of the respective cameras 16, 18, and may be stored in database 38 accessible to the computing device 82.

The memory 20 may represent any type of non-transitory computer readable medium such as random access memory (RAM), read only memory (ROM), magnetic disk or tape, optical disk, flash memory, or holographic memory. In one embodiment, the memory 20 comprises a combination of random access memory and read only memory. In some embodiments, the processor 24 and memory 20 may be combined in a single chip.

The network interface 26, 28 allows the computer 82 to communicate with other devices via a wired or wireless link, such as a computer network, such as a local area network (LAN) or wide area network (WAN), or the Internet, and may comprise a modulator/demodulator (MODEM) a router, a cable, and/or Ethernet port.

The digital processor 24 can be variously embodied, such as by a single-core processor, a dual-core processor (or more generally by a multiple-core processor), a digital processor and cooperating math coprocessor, a digital controller, or the like. The digital processor 24, in addition to controlling the operation of the computer 82, executes instructions stored in memory 20 for performing the method outlined in FIG. 2.

In some embodiments, the system 10 can be used simply as a system for generating parts of the reidentification system, e.g., containing the adaptation component 44, while other components may be omitted. In other embodiments, the system 10 can be used for employing the already adapted camera-dependent generative models 62, 64, while other components, such as the training and adaptation components 42, 44 may be omitted.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2A:
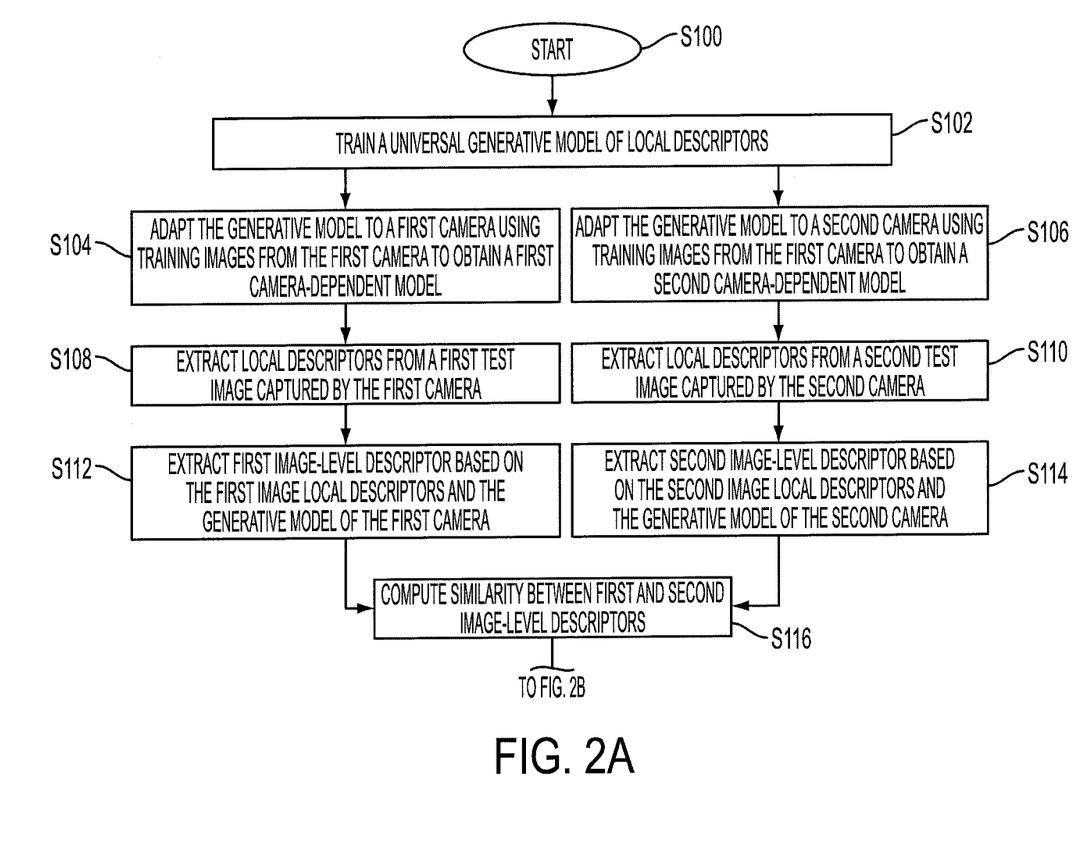
FIG. 2A and FIG. 2B, is flow chart illustrating a method for object re-identification in accordance with another aspect of the exemplary embodiment.

FIG. 2 illustrates a method for object re-identification, which may be performed with the system of FIG. 1. Starting with FIG. 2A, the method begins at S100.

At S102, a universal generative model UBM 60 of local descriptors is provided. This may include training the UBM 60 with the training component 42. The UBM 60 includes parameters for a set of K Gaussian functions (also referred to as Gaussians or mixtures). In some embodiments, the universal generative model UBM 60 may have been previously trained and may simply be stored in memory 20 accessible to the system 10.

At S104, the universal generative model 60 is adapted to a first camera 16 to obtain a first camera-dependent generative model 62. This is performed using descriptors extracted from a first set of training images 66 captured by the first camera 16 (i.e., using descriptors only from images captured by the first camera and not by the second camera). The first camera-dependent generative model 62 includes parameters for a set of K Gaussians generated by adapting the parameters of the UBM 60 using the descriptors extracted from the first set of training images 66.

At S106, the universal generative model 60 is adapted to a second camera 18 to obtain a second camera-dependent generative model 64. This is performed using descriptors extracted from a second set of training images 68 captured by the second camera 18 (i.e., using descriptors only from images captured by the second camera and not by the first camera). The second camera-dependent generative model 64 includes parameters for a set of K Gaussians generated by adapting the parameters of the UBM 60 using the descriptors extracted from the second set of training images 68. GMMs 62 and 64 thus include parameters for the same number of Gaussian functions as the UBM 60. In another embodiment, the universal generative model is used as the second camera-dependent generative model (and may thus be generated with descriptors acquired solely or primarily from images captured by that camera).

At S108, local descriptors 54 are extracted from a first test image 12 captured by the first camera 16.

At S110, local descriptors 56 are extracted from a second test image 14 captured by the second camera 18.

At S112, a first image-level descriptor 70 is generated based on the first image local descriptors 54 and the adapted generative model $u_\Theta^c x$ 62 of the first camera 16.

At S114, a second image-level descriptor 72 is generated based on the second image local descriptors 56 and the adapted generative model $u_\Theta^c y$ 64 of the second camera 18.

At S116, the first and second image-level descriptors 70, 72 are compared. Continuing on to FIG. 2B, if at S118, the similarity between the signatures meets a threshold (and/or is the highest similarity of a set of images being compared), then at S120, a match is confirmed.

Figure 2B:
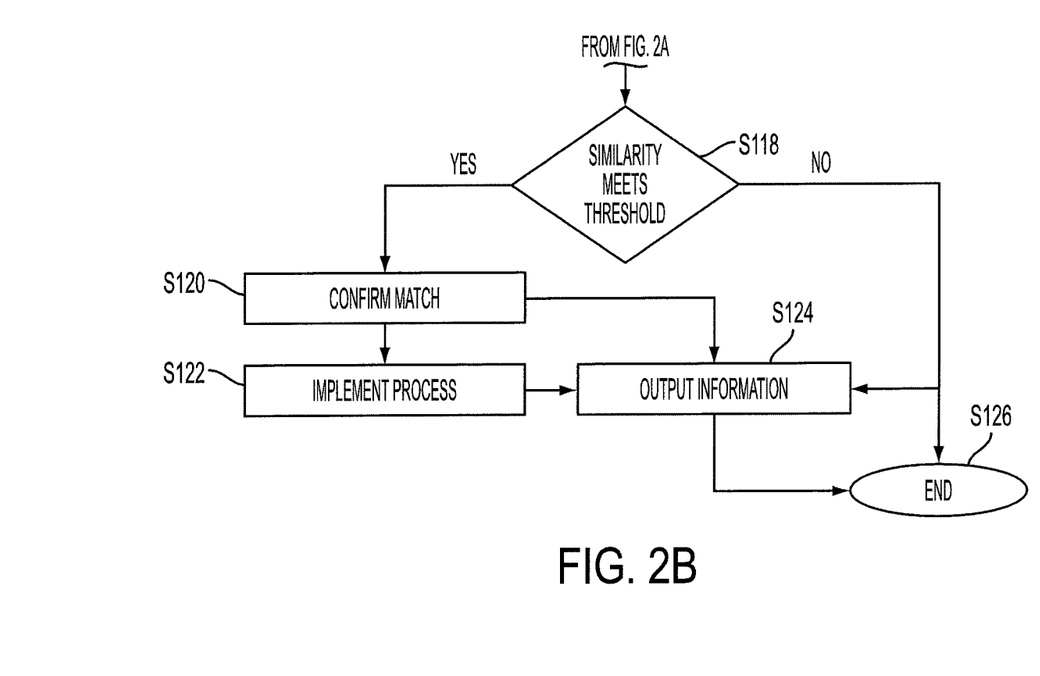

At S122, a process may be implemented based on the determination of a match.

At S124, information 30 is output, such as whether or not there is a match or other information computed when a match is found (or in another embodiment, information may be computed when no match is found).

The method ends at S126 or may return to S108 and or S110 for processing a new test image or images captured by one of the cameras.

As will be appreciated, once the adaptation steps have been performed, the method can begin at S108. Alternatively, the method can proceed from S106 to the provision of components for performing subsequent steps of the method.

Figure 3:
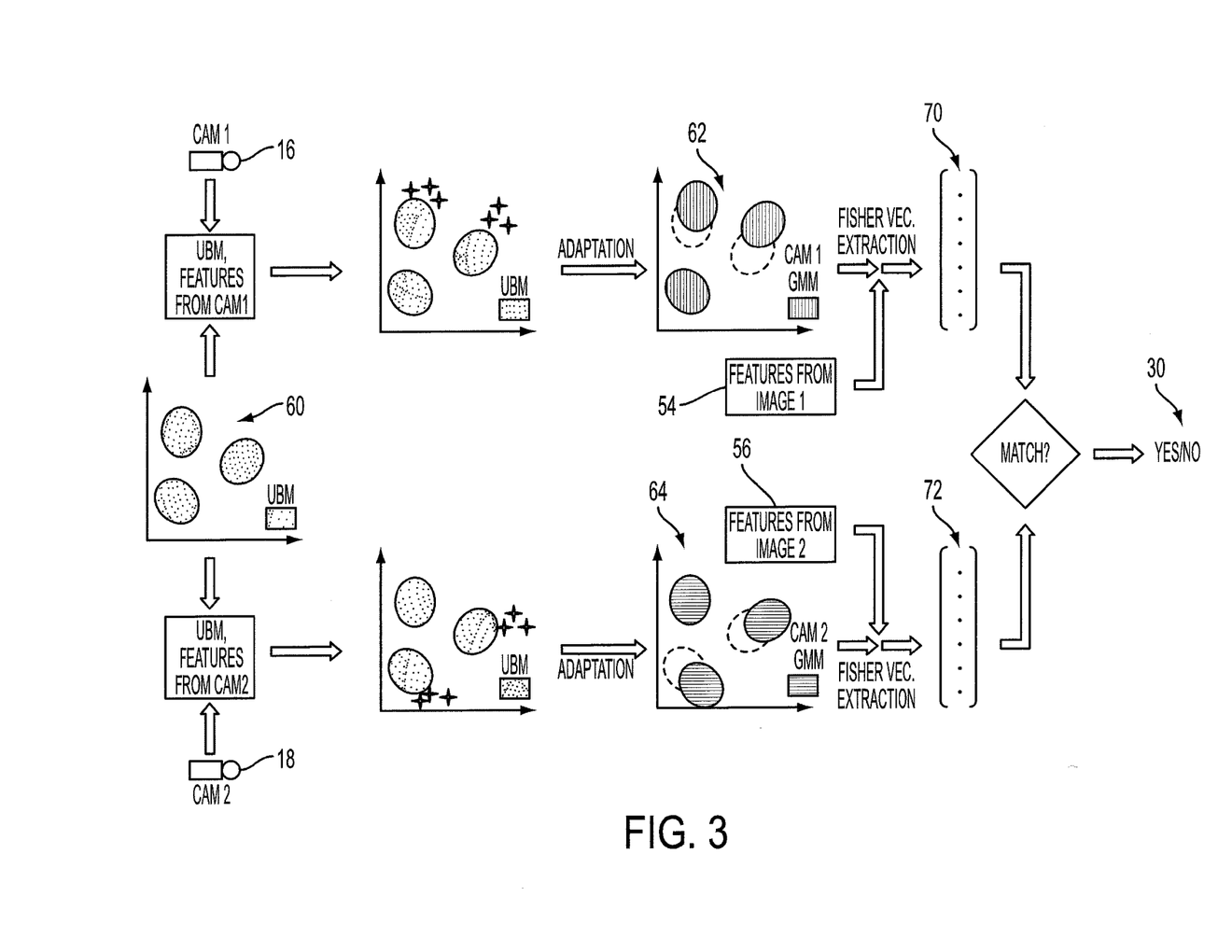
FIG. 3 graphically illustrates the generation of adapted GMMs.

The method is illustrated graphically in FIG. 3. In particular, it can be seen that each camera-dependent mixture model is formed by shifting (by mean adaptation) and/or scaling (by variance adaptation) at least some of the original Gaussians (shown by the ovals) of the UBM slightly to reflect the camera-specific descriptors (shown by the stars). The adapted Gaussians of the camera-dependent mixture models still represent the same general visual classes as in the UBM (as illustrated by their overlap with the original Gaussians) and thus are comparable in the image-level representations.

The method illustrated in FIGS. 2 and 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 82, (for example, an internal hard drive of RAM), or may be separate (for example, an external hard drive operatively connected with the computer 82), or may be separate and accessed via a digital data network such as a local area network (LAN) or the Internet (for example, as a redundant array of inexpensive of independent disks (RAID) or other network server storage that is indirectly accessed by the computer 82, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for object reidentification. As will be appreciated, while the steps of the method may all be computer implemented, in some embodiments one or more of the steps may be at least partially performed manually.

Further details of the system and method will now be described.

Image Capture

Captured images 12, 14 ($I_X$ and $I_Y$) and training images 34, 66, 68 may be received by the system 10 in any convenient file format, such as JPEG, GIF, JBIG, BMP, TIFF, or the like or other common file format used for images and which may optionally be converted to another suitable format prior to processing. The input images may be stored in data memory during processing. The images may be individual images, such as photographs, or images extracted from sequences of images, such as video images. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The method is suitable for black and white (monochrome) images and multicolor images. The word "color" is used to refer to any aspect of color which may be specified, including, but not limited to, absolute color values, such as hue, chroma, and lightness, and relative color values, such as differences in hue, chroma, and lightness. In some embodiments, color can refer to a non-visible region of the electromagnetic spectrum, such as the Near Infrared (NIR) region, which is from about 800 nm to 2500 nm.

The image capture at a given location X, Y may be triggered in any suitable manner. In one embodiment, a loop sensor may be locally positioned, e.g., in the ground, which detects the presence of a vehicle and triggers a shot (and possibly a flash). In one embodiment, the camera 16, 18 shoots a video comprising a sequence of images and a motion detection algorithm or an object detection algorithm (or the combination of both) is employed which detects the presence of a vehicle in the image sequence and selects one image from the sequence accordingly. Vehicle detection techniques are well known and disclosed for example, in U.S. Pat. Nos. 4,433,325, 5,083,200, 5,592,567, 5,809,161, 5,995,900, 6,996,255, and U.S. Pub. Nos. 20140270381, and 20140063263, the disclosures of all of which are incorporated herein in their entireties by reference. The image can be captured in full color, monochrome, NIR (near infrared), or a combination thereof.

In some embodiments, the same image capture device could be used for capturing both images $I_X$ and $I_Y$, such as in a car park, for example, by rotating/moving the camera.

The associated metadata 74, 76 may include sufficient information to enable a determination to be made as to whether a predetermined condition has been met. One or more different types of information may be acquired, such as one or more of time stamp, current speed of the vehicle, GPS location, payment information, weather information, and the like.

Extracting Local Descriptors (S108, S110)

Local descriptors are extracted from training and test images 34, 66, 68, 12, 14 in the same manner. For example, a set of patches of the optionally cropped image are extracted, e.g., densely, on a grid at one or at multiple scales. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire cropped image, or at least a part or a majority of the image. For example, at least 10 or at least 20 or at least 50 patches are extracted from each cropped image. Each patch may comprise at least 40 or at least 100 pixels, and up to 1,000,000 pixels or more.

For each patch, low-level features are extracted, such as shape, color and/or gradient (SIFT) features (see, D. Lowe, "Distinctive image features from scale-invariant keypoints," IJCV, 2004). A patch descriptor, such as a vector or histogram, which is a representation of the extracted low level features for a patch, is generated. Based on the descriptors of all the patches, on overall image signature of the image is generated. In particular, statistics are computed on these patch descriptors and then the statistics are aggregated.

As an example, the local descriptors include gradient features, such as SIFT descriptors, one per patch. In one illustrative example employing SIFT features, the local descriptors are extracted from 32×32 pixel patches on regular grids (every 16 pixels) at five scales. The dimensionality of these descriptors can be reduced from 128 to 32 dimensions, for example, through Principal Component Analysis (PCA). Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used.

Extracting Image Signatures (S112, S114)

Each image-level descriptor or "image signature" 70, 72, etc., is a fixed-length vectorial representation of the (optionally cropped) image in a D-dimensional space. In one embodiment, the image-level descriptor is based on the Fisher Vector (FV). See, for example, Perronnin and Dance, "Fisher kernels on visual vocabularies for image categorization," CVPR, 2007; Perronnin, et al., "Improving the Fisher kernel for large-scale image classification", ECCV, 143-156 (2010); Sánchez, et al., "High-dimensional signature compression for large-scale image classification," in CVPR 2011; U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al.; and U.S. Pub. No. 20120045134, published Feb. 23, 2012, entitled LARGE SCALE IMAGE CLASSIFICATION, by Florent Perronnin, et al. the disclosures of which are incorporated herein by reference in their entireties. Fisher vectors have demonstrated good results in a variety of applications including image classification, image retrieval, object detection, and person re-identification. Hence, any improvement that can be brought on top of Fisher Vectors will have a significant impact on many applications. In the following, Fisher Vector extraction is described, followed by a description of an adaptation technique.

Fisher Vectors show robustness in the range of photometric and geometric variability found in license plate processing. Briefly, Fisher vectors work by aggregating the local patch descriptors into a fixed-length representation. As discussed above, SIFT and/or other local descriptors are extracted from patches extracted at multiple scales on a regular grid, and their dimensionality is optionally reduced using principal component analysis (PCA). Given a camera-specific Gaussian mixture model (GMM) estimated as described below, from which it is assumed all the local descriptors are emitted, the set of patches can be characterized by a vector of weights, one weight per for each of a set of (e.g., at least 5 or 10) Gaussian functions forming the mixture model, per parameter.

In the present case, suppose $X=\{x_1, x_2, \ldots, x_N\}$ is a set of N multi-dimensional feature vectors (local descriptors) extracted from image patches. Let $u_\Theta$ be the probability density function of the generative model producing such feature vectors, where $\Theta$ represents the parameters of the probability density function. Then the Fisher Vector is given by:

$$g_\Theta^X = \frac{1}{N} \sum_{i=1}^{N} L_\Theta \nabla_\Theta \log u_\Theta(x_i) \tag{1}$$

where $L_\Theta$ is the square-root of the inverse of the Fisher Information Matrix of $u_\Theta$. $\Sigma_{i=1}^N \log u_\Theta(x_i)$ is the log-likelihood of the data samples (patch descriptors) $x_i$ with respect to $u_\Theta$. Thus, computing its gradient ($\nabla_\Theta$) gives a measure of how the parameters of the generative model $u_\Theta$ should be modified to better fit the data samples in X. See, Sánchez 2013. The gradient can be computed with respect to one or more of the parameters of the GMM, such as the mean, variance, and/or weight.

The Universal Generative Model (S102)

In the exemplary method, the universal generative model $u_\Theta$ 60 is a K-component Gaussian Mixture Model (GMM) with parameters $\Theta=\{\pi_k, \mu_k, \Sigma_k, k=1, \ldots, K\}$, where $\pi_k$, $\mu_k$ and $\Sigma_k$ are respectively the weight, mean vector, and covariance matrix of the k-th Gaussian. For convenience, let:

$$\forall_k : \pi_k \geq 0, \text{ and } \Sigma_{k=1}^K \pi_k = 1 \quad (2)$$

Thus, for any feature vector $x_i$:

$$u_\Theta(x_i) = \Sigma_{k=1}^K \pi_k u_k(x_i) \quad (3)$$

where, $$u_k(x_i) = \frac{1}{(2\pi)^{\frac{p}{2}} |\Sigma|^{\frac{1}{2}}} \exp\left\{-\frac{1}{2}(x_i-\mu_k)'\Sigma^{-1}(x_i-\mu_k)\right\} \quad (4)$$

p is the dimensionality of the feature vectors, $x_i$. The GMM 60 is learned apriori using local descriptors extracted from training images 34 and may be referred to as a Universal Background Model (UBM (following the convention from speech processing, see, for example, Douglas A. Reynolds, et al., "Speaker verification using adapted Gaussian mixture models," Digital Signal Processing, 10(13):19-41 (2000)).

After computing $L_\Theta$ under some assumptions as in Sánchez 2013, and considering diagonal covariance matrices $\Sigma_k$, the equations (derived from Equation (1)) for each of the different parameters of the GMM can be deduced. However, it has been found that deriving the Fisher Vectors using only the means gives good performance in matching applications. Hence, for the gradient with respect to the means $\Sigma_k$:

$$g_{\mu_k}^X = \frac{1}{N} \frac{1}{\sqrt{\pi_k}} \sum_{i=1}^N p(k|x_i)\left(\frac{x_i-\mu_k}{\sigma_k}\right) \quad (5)$$

where:

$$p(k|x_i) = \frac{\pi_k u_{\theta_k}(x_i)}{\sum_{j=1}^K \pi_j u_{\theta_j}(x_i)} \quad (6)$$

Here, $\sigma_k$ are the diagonal entries of the diagonal covariance matrix for the k-th Gaussian and division implies an element-wise operation. Also, $u_{\Theta_k}(x_i)$ is the value of the pdf for k-th Gaussian at $x_i$. Note that $g_{\mu_k}^X$ is a p×1 vector. The final Fisher Vector is the concatenation of the gradients $g_{\mu_k}^X$ for all K Gaussian functions in the mixture model. Hence, it is a Kp-dim vector. This may then be sign-square-rooted and $l_2$-normalized. See, Sánchez 2013.

Suppose that cameras 16, 18 have differing imaging conditions. One approach to counter balance the imaging conditions would be to learn a GMM for each camera independently from scratch. However, this does not provide correspondence among different Gaussians from different GMMs. Thus, comparing Fisher Vectors across cameras would be difficult, since Fisher Vectors are constructed as a concatenation of gradient statistics for all the Gaussian s. In the present method the model parameters of the UBM 60 are adapted for the images from different cameras, to yield camera-specific GMMs 62, 64. Afterwards, when these camera-specific GMMs 62, 64 are used to compute Fisher Vectors, they primarily encode the deviations which are specific to a particular image and not the differences in imaging conditions.

As will be appreciated, bag-of-word image-level descriptors are also generated by a Gaussian Mixture Model and thus the method is also applicable to these image-level descriptors. See, e.g., Csurka, et al., "Visual Categorization with Bags of Key-points," in ECCV Workshop on Statistical Learning for Computer Vision (2004), U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin, and U.S. Pub. No. 20120045134, published Feb. 23, 2012, entitled LARGE SCALE IMAGE CLASSIFICATION, by Florent Perronnin, et al., the disclosures of which are incorporated by reference, for a fuller description of bag-of-word image-level descriptors.

Adapting the Generative Model (S104, S106)

The exemplary image-level descriptors 70, 72 are Fisher vectors, which are extracted from the test images 12, 14 in a similar manner. However, the generative models 62 and 64 used to generate them are different.

To explain the need for adaptation further, consider Equation (5), the gradient of the Fisher vector with respect to the mean vector:

$$\begin{aligned} g_{\mu_k}^X &= \frac{1}{N}\frac{1}{\sqrt{\pi_k}} \sum_{i=1}^N p(k|x_i)\left(\frac{x_i-\mu_k}{\sigma_k}\right) \\ &= \frac{1}{N}\frac{1}{\sigma_k\sqrt{\pi_k}}\left(\sum_{i=1}^N p(k|x_i)x_i - \sum_{i=1}^N p(k|x_i)\mu_k\right) \\ &= \frac{1}{N}\frac{1}{\sigma_k\sqrt{\pi_k}}\left(\sum_{i=1}^N p(k|x_i)x_i - \mu_k\sum_{i=1}^N p(k|x_i)\right) \\ &= \frac{1}{N}\frac{1}{\sigma_k\sqrt{\pi_k}}\left(\sum_{i=1}^N p(k|x_i)x_i - \mu_k\hat{n}_k\right) \\ &= \frac{\hat{n}_k}{N}\frac{1}{\sigma_k\sqrt{\pi_k}}\left(\frac{1}{\hat{n}_k}\sum_{i=1}^N p(k|x_i)x_i - \mu_k\right) \\ \Rightarrow g_{\mu_k}^X &= \frac{\hat{\pi}_k}{\sigma_k\sqrt{\pi_k}}(\hat{m}_k - \mu_k) \end{aligned} \quad (7)$$

where:

$$\hat{n}_k = \sum_{i=1}^N p(k|x_i)$$

$$\hat{\pi}_k = \frac{\hat{n}_k}{N}$$

$$\hat{m}_k = \frac{1}{\hat{n}_k}\sum_{i=1}^N p(k|x_i)x_i.$$

Note that $\hat{m}_k$ and $\hat{\pi}_k$ are respectively the estimates of the mean vector and mixing weight of k-th Gaussian component given the data samples from X. Thus Equation (7) defines the Fisher Vector as a function of the difference between the estimated mean vector ($\hat{m}_k$) and the respective UBM Gaussian mean vector ($\mu_k$).

The support $\Omega_k$ of a Gaussian k is defined as: $\Omega_k=\{x: k=\text{argmax}_i p(i|x)\}$. Hence, if the change in imaging conditions can be modeled by a piecewise-constant shift $\delta_k$ over the support of each Gaussian k, then the corrupted UBM mean $\mu_k$ and image-specific mean $\hat{m}_k$ become $\mu_k + \delta_k$ and $\hat{m}_k + \delta_k$ (making a hard assignment assumption, meaning that p(i|x) is assumed to be binary, which is reasonable for high-dimensional input vectors x). However, the influence of $\delta_k$ cancels-out in Equation (7) thus justifying the UBM adaptation strategy.

Various adaptation methods are contemplated. These include the maximum a posteriori (MAP) adaptation, the adaptation methods from the linear transformation family, e.g., Maximum Likelihood Linear Regression (MLLR), techniques from the speaker clustering family, e.g., Eigenvoices, e.g., adapted from speech recognition methods (see, Douglas A. Reynolds, et al., "Speaker verification using adapted Gaussian mixture models," Digital Signal Processing, 10(13):19-41 (2000), hereinafter, Reynolds, et al.). The choice may depend on the amount of adaptation data available and the intended application. As an example MAP adaptation may be used.

MAP Adaptation

The exemplary adaptation process is fully unsupervised: given a set of images associated with a camera 16 or 18, information on the content of these images (such as labels) is not needed to adapt the UBM 60 to generate the camera-specific models 62, 64.

In MAP adaptation, a camera specific model $u_\Theta^c$ is derived by updating the well-trained parameters in the UBM $u_\Theta$, using the local descriptors extracted from the images 66 or 68 taken with the respective camera c. The adaptation can be performed in a two-step Expectation-Maximization (EM) iterative process (see, e.g., Jeff A. Bilmes, et al. "A gentle tutorial of the EM algorithm and its application to parameter estimation for Gaussian mixture and Hidden Markov models," Intern'l Computer Science Institute, 4(510), p. 126 (1998), for a discussion of EM). In the first step the estimates of the sufficient statistics of the features from the camera c are computed (probabilistic count, first and second moments) for each Gaussian in the UBM. These are then combined with the old sufficient statistics from the UBM Gaussians. This combination is performed through a data-dependent mixing coefficient. This coefficient puts more weight on the new sufficient statistics for the Gaussians that have a higher probabilistic count from the adaptation data.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Suppose $X = \{x_1, x_2, \ldots, x_{N_c}\}$ is a set of $N_c$ feature vectors (local descriptors) extracted from the overlapping or non-overlapping patches from the training images 66 or 68 from a camera c. For each Gaussian k and feature vector $x_i$, the probability $p(k|x_i)$ is computed in the first, Expectation step, from Equation (6). Then, $p(k|x_i)$ and $x_i$ are used to compute the probabilistic count of each Gaussian k and first and second moments (see, Reynolds, et al.) according to Equations 8-10:

$$n_k = \sum_{i=1}^{N_c} p(k|x_i) \qquad (8)$$

$$m_k = \frac{1}{n_k} \sum_{i=1}^{N_c} p(k|x_i) x_i \qquad (9)$$

$$s_k = \frac{1}{n_k} \sum_{i=1}^{N_c} p(k|x_i) \mathrm{diag}(x_i x_i') \qquad (10)$$

$n_k$ is the responsibility of a Gaussian k—an estimation of how many points $x_i$ are assigned to that Gaussian. $m_k$ is the first order statistic—an estimate of the mean of all points assigned to Gaussian k. $s_k$ is the second order statistic—an estimate of the statistical variance of all points in Gaussian k. In the second, Maximization step, these statistics are then used to update the UBM parameters for each Gaussian k using the following equations:

For the mixture weight:

$$\hat{\pi}_k^c = \left[\tau_k^\pi \frac{n_k}{N_c} + (1-\tau_k^\pi)\pi_k\right]\alpha \qquad (11)$$

For the mean vector: $\hat{\mu}_k^c = \tau_k^\mu m_k + (1-\tau_k^\mu)\mu_k$ (12)

For the covariance matrix: $\hat{\sigma}_k^c = \tau_k^\sigma s_k + (1-\tau_k^\sigma)(\sigma_k^2 + \mu_k^2) - (\mu_k^c)^2$ (13)

The above two-step process is then repeated, several times with the updated UBM parameters, e.g., for I iterations or until convergence, or some other stopping criterion is met. $\alpha$ in Equation 11 is recomputed over all Gaussians to make sure that $\Sigma_k \pi_k^c = 1$ holds true. The adaptation parameters $\tau_k^\rho$, for each parameter $\rho\Sigma\{\pi, \mu, \sigma\}$, are given by, $$\tau_k^\rho = \frac{n_k}{n_k + r^\rho} \qquad (14)$$

Here r is a design parameter which controls the level of adaptation between new and old statistics and can be established by cross-validation. Note that once r is fixed, the new statistics are emphasized more in those Gaussians which have a higher probabilistic count $n_k$ for the adaptation data. In practice the same adaptation parameter can be used for all parameters of all Gaussians, i.e., $\tau_k^\rho = \tau$. As will be appreciated, fewer than three parameters may be considered, such as one or two of the exemplary parameters $\pi$, $\mu$, $\sigma$ are updated and/or used to generate the weights (dimension values) for each Fisher vector.

To include spatial information about the cropped image, the image can be partitioned into regions, such as at least three regions, the per-patch statistics aggregated at a region level, and then the region-level representations concatenated to form the image representation. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

The exemplary image signatures are of a fixed dimensionality D, i.e., each image representation has the same number of elements which is a function of the number of Gaussians and the number of parameters considered. For example, if a visual vocabulary of 32 Gaussians is used in the GMMs 60, 62, 64 and two of the parameters are considered. This results in a 32×2=64-dimensional FV representation.

Using the FV representation has other advantages in license plate matching as it obscures the license plate number. It does not allow recognition of the license plate number from it since the original image cannot be reconstructed from it, and therefore it can be seen as a hash key of the original image as there is no feasible way to recover the original image (or the license plate number) from the image signature. This is because the identity of the individual patches is lost in the aggregation process. Consequently, this retains the privacy of the license plate number (or other private information in the image) until the need for use of that information has been established (for example, by establishing that the speed of the vehicle captured in the images has exceeded a threshold speed).

Comparing Image Signatures (S116, S118)

In some embodiments, the image signatures of at location X are stored in the database 38 and then a search for a closest match among these stored signatures is performed in an exhaustive manner for each image signature subsequently acquired at location Y. When the database 38 contains a larger number of images, an exhaustive search may be time consuming. In this case, an approximate search technique may be employed. Techniques for the approximate search of high-dimensional vectors are disclosed, for example, in Jégou, et al., "Aggregating local image descriptors into compact codes," IEEE TPAMI, 34(9)1704-1716 (2012). The identity of the closest match is assigned, provided the similarity at least meets a predetermined threshold.

Since the Fisher vector is an explicit embedding of the Fisher kernel, the corresponding cosine similarity measure between two such image descriptors $SI_X$ and $SI_Y$ is the dot product $SI_X^T SI_Y$.

In one embodiment, the image signature (e.g., the FV) can be made more discriminative by applying a projection which is obtained, for instance, by learning a metric for embedding the image signature into a vectorial space where similarity is a good indicator for actual similarity (in terms of the character sequences forming the identifiers). As an example, a low-rank Mahalanobis metric can be employed, see for example, Rodríguez-Serrano, et al., "Data-Driven Vehicle Identification by Image Matching". 12$^{th}$ European Conf. on Computer Vision (ECCV) Workshops, Oct. 7-13, 2012, Lecture Notes in Computer Science, vol. 7584, pp. 536-545. See also U.S. Pub. Nos. 20140056520 and 20140219563, and U.S. application Ser. No. 13/903,218, the disclosures of which are incorporated by reference in their entireties, for descriptions of exemplary embedding techniques.

Process Implementation (S122)

License plate recognition methods which may be used at S122 are disclosed, for example, in U.S. Pub. Nos. 20130129151, 20130129152, 20130182909, 20130259314, 20140056520, 20140270381, and 20140219563 and U.S. application Ser. No. 13/903,218, and in J-A. Rodríguez-Serrano, et al., "Data-Driven Vehicle Identification by Image Matching". 12$^{th}$ European Conf. on Computer Vision (ECCV) Workshops, Oct. 7-13, 2012, Lecture Notes in Computer Science, vol. 7584, pp. 536-545. In one embodiment, Xerox License Plate Recognition (XLPR) software is employed. As will be appreciated, the license plate number and image of a license plate are exemplary only and are used to illustrate the exemplary embodiment. In other embodiments, a larger set of ASCII, UNICODE, and/or UTF-8 characters may be used as the alphabet.

The action initiated by the processing component 50 may depend on the type of application. In the case of license plates, the action triggered may be associated to the respective license plate number identified (e.g., prosecute the violator, alert parking operator, send parking fine, etc.). In the case of a car park, if the first and second images match (and optionally if a paid-for duration between the capture of the two images has not been exceeded), a barrier to the car park may automatically open.

While the illustrative embodiments disclosed herein are directed to camera-based vehicle labeling tasks, it will be appreciated that similar difficulties arise in other camera-based object labeling tasks in which multiple still or video cameras are used to acquire images of objects to be labeled (or in which the same camera is used to acquire the images over different time intervals and/or at different locations). For example, in a retail or advertising setting it may be useful to employ camera-based customer labeling as to gender, age, or so forth in order to provide targeted advertising. In this case the objects to be labeled are human beings (or parts, such as faces). In an event attendance monitoring system images may be labeled as to the number of people shown in the image. Objects may also be animals, or inanimate objects such as the illustrative vehicles. As further examples of camera-based labeling of inanimate objects of interest, in a retail assembly line articles of manufacture may be labeled as to the presence or absence of a certain defect based on an imaging technology that is capable of observing the defect. In the case of a security scanner, the camera may be an x-ray imager or other specialized imaging device, and the object labeling seeks to identify inanimate objects of concern such as firearms, knives, fluids, and so forth. These are merely illustrative examples. The adapted mixture models can also find use in classification (images from different cameras can be classified with the same classifier, which may have been trained on image-level descriptors extracted from training images 34 and respective labels).

Without intending to limit the scope of the exemplary embodiment, the following examples illustrate the applicability of the method to license plate matching.

EXAMPLES

The method was applied to the problem of vehicle license plate matching/re-identification. Cameras are positioned on various entry-exit lanes of a parking lot. The aim is to match the license plate of a vehicle exiting the parking lot to its license plate image which was captured when this vehicle entered the lot. However, the imaging conditions in both cases may be very different. The different imaging conditions may include different geometry, different camera quality, different lighting conditions etc. This scenario is a good candidate for adaptation of the UBM to learn camera-specific (lane-specific) GMMs before Fisher Vector computation, to aid in matching.

Datasets

Two in-house datasets coming from two real parking facilities in different cities are denoted A and B. Both datasets are pre-processed by extracting the license plate regions and normalizing the height to 50 pixels. Dataset A has 13,006 images (6503 entry-exit pairs) from 11 lanes/cameras. Five out of 11 are entry lanes while the rest are the exit lanes with varying distribution of entry-exit statistics. For dataset B, 9,629 images from two lanes were used.

Experimental Setup

Features and local descriptors were extracted from overlapping patches from the images. Each dataset is divided into three parts. The first part is used to learn the PCA model for dimensionality reduction of the local descriptors and UBM estimation, the second is used for UBM adaptation and the third is used for testing. During testing, the exiting license plates are matched with the entering ones and the results are reported as a percentage of correctly matched pairs.

In one test, after learning the UBM on the first part of Dataset A with images from all the lanes/cameras, the UBM is adapted to each of the different lanes/cameras of Dataset A to generate camera-specific GMMs, using images from the respective lanes in the second part. Then the images in the third part and the adapted GMMs are used to compute Fisher Vectors which are then used for matching.

In another test, the first part of the images from Dataset B is used to learn the UBM. This UBM is then adapted using the second part of Dataset A which is followed by testing on the third part of Dataset A. This mimics a scenario when the UBM is learned on images which are not from the same dataset/parking lot.

The results of image matching with adapted GMMs are compared to two baselines:

1. The system without adaptation ('No adapt.').

2. The system after mean and standard deviation adjustment ('mean-std adj.'): For each camera, the mean and standard deviation of its training samples (second part) is computed and test vectors standardized accordingly. The mean adjustment is a domain adaptation approach which was proposed for the VLAD image descriptor. See Relja Arandjelovic, et al., "All about VLAD," Proc. 2013 IEEE Conf. on Computer Vision and Pattern Recognition (CVPR '13), pp. 1578-1585 (2013) for a description of VLAD image descriptors. The VLAD image descriptor is closely related to the Fisher Vector, but does not have the probabilistic interpretation of the Fisher Vector. Mean and standard deviation adjustment is a natural extension of the mean adjustment approach. Note that this can be understood as a diagonal approximation of the subspace alignment approach of Basura Fernando, et al., "Unsupervised visual domain adaptation using subspace alignment, ICCV, pp. 2960-2967 (2013), which is more practical when dealing with high-dimensional vectors.

There are various options for UBM adaptation. For example, all the UBM parameters are adapted or parameters or to be adapted are selected. In these examples, both means and variances are adapted. Weight adaptation was found to have little additional impact.

Results

Tables 1-4 show the results using different numbers of Gaussians in the GMMs (Nmix), with MAP adaptation (MAP Adapt.), without MAP adaptation (No Adapt.), and with mean and standard deviation adjustment (Mean-Std. Adj.). Tables 1 and 2 give the results when only the mean vectors are adapted, while Tables 3 and 4 give the results for the case when both mean vectors and covariance matrices are adapted. 'Inc.' indicates the performance improvement with MAP adaptation over no adaptation.

TABLE 1

Results for UBM learnt on Dataset A, followed by mean vector adaptation and testing on Dataset A

| Nmix | No Adapt. | Mean-Std. Adj. | MAP Adapt. | Inc. |
|------|-----------|----------------|------------|-------|
| 32   | 81.89%    | 81.41%         | 82.37%     | 0.48% |
| 64   | 82.77%    | 82.17%         | 83.53%     | 0.76% |
| 128  | 83.45%    | 83.01%         | 84.49%     | 1.04% |

TABLE 2

Results for UBM learnt on Dataset B, followed by mean vector adaptation and testing on Dataset A

| Nmix | No Adapt. | Mean-Std. Adj. | MAP Adapt. | Inc. |
|------|-----------|----------------|------------|-------|
| 32   | 81.05%    | 78.81%         | 83.21%     | 2.16% |
| 64   | 84.13%    | 83.01%         | 85.81%     | 1.68% |
| 128  | 84.89%    | 84.17%         | 85.85%     | 0.96% |

TABLE 3

Results for UBM learnt on Dataset A, followed by mean vector and covariance matrix adaptation and testing on Dataset A

| Nmix | No Adapt. | Mean-Std. Adj. | MAP Adapt. | Inc. |
|------|-----------|----------------|------------|-------|
| 32   | 81.89%    | 81.41%         | 82.01%     | 0.12% |
| 64   | 82.77%    | 82.17%         | 83.13%     | 0.36% |
| 128  | 83.45%    | 83.01%         | 84.73%     | 1.28% |

TABLE 4

Results for UBM learnt on Dataset B, followed by mean vector and covariance matrix adaptation and testing on Dataset A

| Nmix | No Adapt. | Mean-Std. Adj. | MAP Adapt. | Inc. |
|------|-----------|----------------|------------|-------|
| 32   | 81.05%    | 78.81%         | 82.81%     | 1.76% |
| 64   | 84.13%    | 83.01%         | 85.29%     | 1.16% |
| 128  | 84.89%    | 84.17%         | 86.41%     | 1.52% |

It can be seen from Tables 1-4 that MAP adaptation gives performance improvement for all cases, while mean and standard deviation adjustment shows a decrease in performance over the No Adaptation baseline. The performance increase with MAP adaptation, over No Adaptation can be as high as 2.16% in these experiments.

Evaluation of Adaptation

To evaluate adaptation, the internal mechanics of assignment of features to different Gaussians in a UBM/GMM are evaluated. As an example, a UBM learned on Dataset B with 32 Gaussians was used. Then adaptation data from Dataset A was taken. The data from Dataset A contains images from 11 lanes. The images from each lane are then used to learn a lane/camera-dependent GMM. Then $p(k|x_i)$ is computed from features $x_i$ for each Gaussian k of the UBM and of each lane/camera-dependent GMM through Equation (6).

Figure 4:
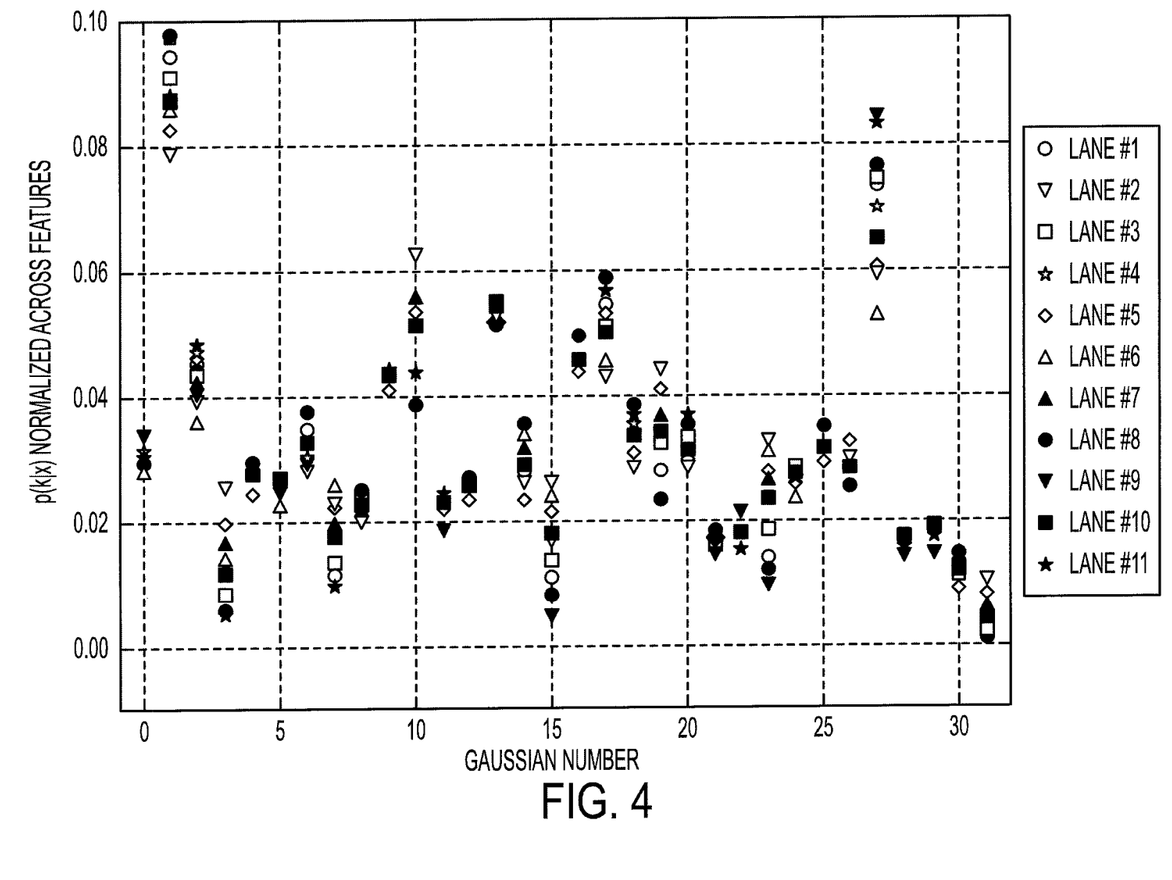
FIG. 4 is a plot of $p(k|x_i)$, averaged across the features $x_i$ from each lane before adaptation.
Figure 5:
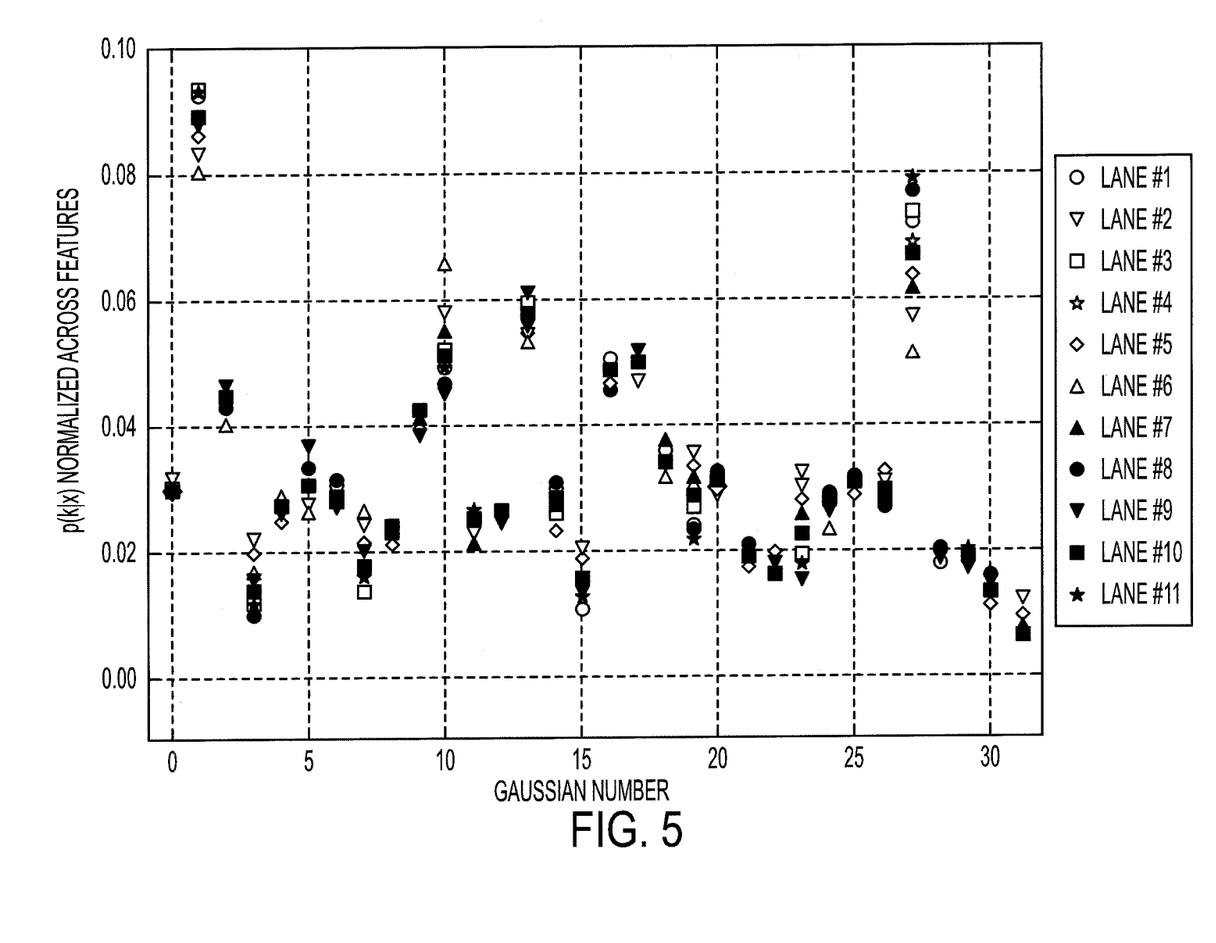
FIG. 5 is a plot of $p(k|x_i)$, averaged across the features $x_i$ from each lane after adaptation.

A plot of $p(k|x_i)$ vs. k, averaged across features $x_i$ from a particular lane in the adaptation dataset was obtained for the UBM (FIG. 4) and for lane/camera-dependent GMMs (FIG. 5). From FIG. 4, it can be seen that when the same UBM is used, there is considerable spread across images from different lanes. For some lanes, some Gaussians have a higher $p(k|x_i)$ while for some other lanes it may be considerably low. This shows that, although the UBM can represent the features, the representation may be different for different lanes/cameras. To counter this shift, the adaptation and then lane/camera specific-GMMs used in FIG. 5 result in the spread being considerably reduced. This shows that when these lane/camera specific-GMMs are used for Fisher Vector computation, the Fisher Vectors can encode the deviations which are due to a particular object in question and not due to the imaging conditions.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
providing a universal generative model of local descriptors;
adapting the universal generative model to a first camera to obtain a first camera-dependent generative model using local descriptors extracted from each of a set of training images captured by the first camera;
adapting the universal generative model to a second camera to obtain a second camera-dependent generative model using local descriptors extracted from each of a set of training images captured by the second camera or using the universal generative model as the second camera-dependent generative model;
from a first test image captured by the first camera, extracting a first image-level descriptor, the first image-level descriptor being a fixed-length vectorial representation of the first test image generated by aggregating local descriptors extracted from the first image into a fixed-length representation using the first camera-dependent generative model;
from a second test image captured by the second camera, extracting a second image-level descriptor, the second image-level descriptor being a fixed-length vectorial representation of the second test image generated by aggregating local descriptors extracted from the second image into a fixed-length representation using the second camera-dependent generative model;
computing a similarity between the first image-level descriptor and the second image-level descriptor; and
outputting information based on the computed similarity, wherein at least one of the adapting the universal generative model to the first and second cameras, extracting the first and second image-level descriptors and the computing of the similarity is performed with a computer processor.

2. The method of claim 1, wherein the universal generative model is a Gaussian Mixture Model.

3. The method of claim 2, wherein the first and second camera-dependent generative models are Gaussian Mixture Models, each comprising a same number of Gaussian functions as the universal generative model.

4. The method of claim 1, wherein the universal generative model includes a set of parameters and the adaptation comprises adapting the parameters of the universal generative model to generate parameters of the first and second camera-dependent generative models.

5. The method of claim 4, wherein the parameters are selected from the group consisting of weight, mean vector, and covariance matrix of each Gaussian of the respective generative model.

6. The method of claim 5, wherein the first image-level descriptor comprises gradients with respect to at least one of the parameters of the first camera-dependent generative model and the second image-level descriptor comprises gradients with respect to at least one of the parameters of the second camera-dependent generative model.

7. The method of claim 1, wherein the first and second image-level descriptors are Fisher vectors.

8. The method of claim 1, wherein the computing the similarity comprises computing a cosine distance between the first and second image-level descriptors.

9. The method of claim 1, wherein a reidentification of an object in the first and second images is confirmed based on the computed similarity meeting a threshold similarity.

10. The method of claim 1, wherein when the similarity meets a threshold similarity, the method comprises extracting license plate information from at least one of the first and second images, the output information comprising the extracted license plate information.

11. The method of claim 1, wherein the adapting of the universal generative model to the first and second cameras is performed with an unsupervised adaptation method.

12. The method of claim 11, wherein the adapting of the universal generative model to the first and second cameras comprises maximum a posteriori (MAP) adaptation of parameters of the universal generative model.

13. The method of claim 1, wherein the adapting of the universal generative model to the first and second cameras comprises extracting local descriptors from images captured by the first and second cameras, the local descriptors from the images captured by the first camera being used to adapt the universal generative model to the first camera, the local descriptors from the images captured by the second camera being used to adapt the universal generative model to the second camera.

14. The method of claim 1, wherein the extracting of the first and second image-level descriptor comprises extracting patches from each of the first and second images and, for each patch, generating a local descriptor, each image-level descriptor estimating a deviation of the respective local descriptors from the respective camera-dependent generative model.

15. The method of claim 1, wherein the providing of the universal generative model comprises training the universal generative model on local descriptors extracted from training images.

16. A computer program product comprising non-transitory memory storing instructions which, when executed by a computer, perform the method of claim 1.

17. A system comprising memory which stores instructions for performing the method of claim 1 and a processor in communication with the memory for executing the instructions.

18. A system comprising:
memory which stores a universal generative model of local descriptors, the universal generative model being a Gaussian Mixture Model including parameters for each of the Gaussians, the parameters including a mixture weight, a mean vector, and a covariance matrix; and
an adaptation component which adapts the parameters of the universal generative model to a first camera to obtain a first camera-dependent generative model and adapts the parameters of the universal generative model to a second camera to obtain a second camera-dependent generative model; and
a processor which implements the adaptation component.

19. The system of claim 18, further comprising:
a matching component which computes a similarity between a first image-level descriptor and a second image-level descriptor, the first image-level descriptor having been extracted from a first image captured by the first camera, using the first camera-dependent generative model, the second image-level descriptor having been extracted from a second image captured by the second camera, using the second camera-dependent generative model.

20. The system of claim 18, further comprising:
a signature generation component which extracts at least one of a first image-level descriptor and a second-image-level descriptor, the first image-level descriptor being extracted from a first image captured by the first camera using the first camera-dependent generative model, the second image-level descriptor being extracted from a second image captured by the second camera using the second camera-dependent generative model.

* * * * *